(12) United States Patent
Bradshaw et al.

(10) Patent No.: US 9,995,394 B2
(45) Date of Patent: Jun. 12, 2018

(54) SEAL RING BACKUP DEVICES AND METHODS FOR PREVENTING EXTRUSION

(75) Inventors: Richard S. Bradshaw, Houston, TX (US); Jeremy Buc Slay, Fort Worth, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 506 days.

(21) Appl. No.: 13/352,829

(22) Filed: Jan. 18, 2012

(65) Prior Publication Data

US 2013/0180733 A1 Jul. 18, 2013

(51) Int. Cl.
*F16J 15/14* (2006.01)
*F16J 15/16* (2006.01)

(52) U.S. Cl.
CPC .............. *F16J 15/166* (2013.01); *Y10T 83/04* (2015.04)

(58) Field of Classification Search
CPC .... F16J 15/0818; F16J 15/0825; F16J 15/123; F16J 15/127; F16J 15/166; Y10T 83/04
USPC .................................................. 277/590–596
See application file for complete search history.

(56) References Cited

U.S. PATENT DOCUMENTS

| 2,420,104 | A | * | 5/1947 | Smith ..................... F16J 15/166 277/453 |
| 2,456,356 | A | | 12/1948 | Aber |
| 2,462,586 | A | | 2/1949 | Whittingham |
| 2,616,731 | A | * | 11/1952 | Osmun .................... F16J 15/56 277/322 |
| 2,739,855 | A | | 3/1956 | Bruning |
| 2,747,954 | A | | 5/1956 | Damm et al. |
| 2,973,978 | A | | 3/1961 | Oppenheim |
| 3,124,502 | A | * | 3/1964 | Radke ..................... F16J 15/20 277/536 |
| 3,132,869 | A | | 5/1964 | Campbell |
| 3,362,720 | A | * | 1/1968 | Henry .................... F16J 15/166 277/638 |
| 3,381,970 | A | | 5/1968 | Brown |
| 3,394,941 | A | | 7/1968 | Traub |
| 3,455,566 | A | | 7/1969 | Hull |
| 3,522,950 | A | | 8/1970 | Schneck, Jr. |
| 3,693,986 | A | | 9/1972 | Lambie |

(Continued)

FOREIGN PATENT DOCUMENTS

EP 0 352 415 A1 1/1990
JP 3199779 A 8/1991
(Continued)

OTHER PUBLICATIONS

Parker Seals, ORD 5700 Parker O-Ring Handbook, Figure 6-2, p. 6-3, Published USA, http://www.darcoid.com/images/uploads/pdfs/ORD%205700%20Parker_O-Ring_Handbook.pdf, 2007.

*Primary Examiner* — Nathan Cumar
(74) *Attorney, Agent, or Firm* — McDermott Will & Emery LLP (57) ABSTRACT

The present invention relates to seal ring back-up devices suitable for use on glands in sealing systems. In particular, the present invention relates to seal ring back-up devices that have been designed to fit into essentially all types of glands and close extrusion gaps. Some embodiments of the present invention provide a seal ring back-up device having an annular body having an inner diameter, an outer diameter, and a scarf cut; and where the annular body is configured to fit a gland and engage a seal ring.

19 Claims, 5 Drawing Sheets

(56) References Cited

U.S. PATENT DOCUMENTS

| | | | |
|---|---|---|---|
| 3,751,047 A * | 8/1973 | McGee | F16J 9/06 |
| | | | 277/468 |
| 4,034,993 A | 7/1977 | Okada et al. | |
| 4,201,392 A * | 5/1980 | Watts | F16J 15/166 |
| | | | 277/558 |
| 4,489,953 A * | 12/1984 | Witt | F16J 15/065 |
| | | | 277/584 |
| 4,674,754 A | 6/1987 | Lair et al. | |
| 4,840,379 A | 6/1989 | Thoman, Jr. | |
| 4,934,656 A | 6/1990 | Groves et al. | |
| 5,118,119 A | 6/1992 | Ditlinger | |
| 5,123,662 A | 6/1992 | Sugimura | |
| 5,131,666 A | 7/1992 | Hutchens | |
| 5,961,123 A | 10/1999 | Ingram et al. | |
| 6,173,968 B1 | 1/2001 | Nelson et al. | |
| 6,758,478 B1 | 7/2004 | Moreno | |
| 7,341,258 B2 | 3/2008 | Holt et al. | |
| 7,516,963 B2 * | 4/2009 | Meller | F16J 15/166 |
| | | | 277/453 |
| 7,828,301 B2 * | 11/2010 | Briscoe | F16J 15/062 |
| | | | 277/611 |
| 2003/0227139 A1 * | 12/2003 | Antoun | 277/467 |
| 2004/0012156 A1 * | 1/2004 | Cobb | F16J 15/3236 |
| | | | 277/602 |
| 2004/0135319 A1 | 7/2004 | Moreno | |
| 2006/0189208 A1 | 8/2006 | Shaikh | |
| 2007/0222162 A1 | 9/2007 | Stoner | |
| 2008/0017814 A1 * | 1/2008 | Berckenhoff | E21B 33/061 |
| | | | 251/1.3 |
| 2010/0019456 A1 * | 1/2010 | Gerrard | F16J 15/102 |
| | | | 277/336 |
| 2010/0052259 A1 | 3/2010 | Lewis | |
| 2010/0320217 A1 | 12/2010 | Okawachi et al. | |
| 2011/0037234 A1 * | 2/2011 | Balsells et al. | 277/562 |

FOREIGN PATENT DOCUMENTS

| | | |
|---|---|---|
| JP | 2002250448 A | 9/2002 |
| JP | 2007247698 A | 3/2006 |
| JP | 2010144789 A | 7/2008 |

* cited by examiner

SEAL RING BACKUP DEVICES AND METHODS FOR PREVENTING EXTRUSION

BACKGROUND

The present invention relates to sealing systems, and more particularly, to seal ring backup devices having a scarf cut and methods of use thereof.

Preventing leakage of fluids such as liquids and gasses between sliding or turning parts of a machine often requires a sealing system that includes at least a seal ring, a seal ring backup device, and a gland designed to receive the seal ring and seal ring backup device. Common examples of seal rings and seal ring backup devices include an o-ring and an o-ring backup device, which are configured to fit into a gland. A gland may be part of a body such as a bore or a movable part such as a piston. As used herein, a "gland" is a machined cavity including a machined groove and mating surfaces into which a seal ring and/or a seal ring backup device are fitted. Within a gland, a seal ring may close the gap between mating parts, allowing a seal to form. A gland is usually made in a portion of metal or another rigid material. In order to form a proper seal, the design characteristics of a gland (e.g., diameter, removable parts, contour of the cavity walls, etc.) must be compatible with the specific design considerations of the seal ring and the seal-ring backup device.

In particular, o-rings are torus, or doughnut-shaped seal rings used to provide a deformable seal for mating parts that may have gaps, among many things, due to parts fit or dimensional tolerances between parts. O-rings are usually molded from elastomers such as deformable rubber and can be found installed on the high pressure side (fluids generally flow from high pressure to low pressure) of a variety of sealed systems including valves, pump shafts, and hydraulic pistons. O-ring backup devices are ring-shaped protective elements used to support the o-rings against mechanical failure (e.g., resulting from extreme deformation) and enhance the pressure rating of an o-ring seal. O-ring backup devices are typically made from relatively rigid materials and installed on the lower pressure side.

While an o-ring's primary function is to provide a seal, an o-ring backup device does not typically have any intended sealing function. Instead, an o-ring backup device is designed to remove extrusion gaps inside a gland. As used herein, "extrusion" generally refers to an extreme case of deformation where a small portion of a seal ring is forced into a small clearance gap within a cavity. As used herein, "clearance gap" generally refers to the gap between two mating surfaces. Extrusion can often lead to physical damage to a seal ring, which leads to seal failure. An o-ring backup device, by way of its design, can reduce or prevent extrusion of the o-ring by effectively closing the clearance gap within the cavity. Thus, an o-ring backup device can prolong the life span of an o-ring within a sealing system and ensure a properly working seal. Seal system pressure ratings can also be significantly increased when seal ring backup devices are used.

In a typical setup, an o-ring may be installed in a sealing system generally featuring a cylindrical surface, such as a piston and cylinder combination, a piston rod and rod guide combination, or a rotating shaft and housing combination. The gland may be machined in an exterior surface of the piston or, alternatively, in an interior surface of the cylinder (sometimes referred to as "the bore"). A proper installation requires that the o-ring fits into the gland and firmly contacts the side walls of the mating surfaces. Elevated temperatures and pressures can impose severe burden on the physical and mechanical properties of an elastomeric o-ring, increasing the tendency for extrusion. A variety of factors can cause extrusion in o-rings including, but not limited to, excessive clearances, o-ring material being too soft, improper machining of the o-ring gland, and improper size of the o-ring.

In order to prevent extrusion of the o-ring, an o-ring backup device may be installed into the gland to contact the o-ring from the low pressure side. Incoming pressure can act on the o-ring backup device, which, in turn, can expand or move too close and essentially eliminate the clearance gap within the gland cavity. This ensures that an o-ring will not extrude into the clearance gap.

While a seal ring backup device is useful and can allow softer elastomers to be used in higher pressure and temperature settings, it may not be useful in all types of glands. For example, an open gland has removable parts that allow a seal ring backup device to easily fit into a gland cavity but, currently, it is believed that there is no known wedge type seal system that can be used in a "blind" gland. Blind gland is also referred to as a closed gland and cannot be taken apart. Extra stretch of the seal ring and seal ring backup device may be necessary when using a blind gland. Thus, a blind gland requires additional design considerations as the inner diameter of the seal ring backup device is smaller than the outer diameter of a gland into which it must fit.

SUMMARY OF THE INVENTION

The present invention relates to sealing systems, and more particularly, to seal ring backup devices having a scarf cut and methods of use thereof.

Some embodiments of the present invention provide seal ring back-up devices comprising: an annular body having an inner diameter, an outer diameter, and a scarf cut; and wherein the annular body is configured to fit a gland and engage a seal ring.

Other embodiments of the present invention provide methods comprising: providing a seal ring back-up device comprising: an annular body having an inner diameter and an outer diameter; and making a scarf cut on the annular body.

Still other embodiments of the present invention provide methods comprising: providing a seal ring back-up device comprising: an annular body having an inner diameter and an outer diameter; providing an elastomeric seal ring; making a scarf cut on the annular body; and placing the seal ring back-up device and a seal ring in a gland thereby providing a seal in a sealing application.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIGS. 3A-3H show cross-sectional views of various configurations for wedge shaped seal ring backup devices.

DETAILED DESCRIPTION

The present invention relates to sealing systems, and more particularly, to seal ring backup devices having a scarf cut and methods of use thereof.

The present invention provides devices and methods for supporting and protecting seal rings against damaging extrusion and mechanical failure. The seal ring backup device 100 provides enhanced protection against extrusion of an o-ring or other seal ring. Seal rings are particularly susceptible to extrusion in high temperature and/or high pressure conditions. These conditions are common in mechanical systems requiring fluidic seals in downhole applications. The seal ring backup device 100 may essentially close any extrusion gap arising from parts fit, dimensional tolerances between parts, or other sources. As a result, elastomers that traditionally lack toughness may also be used as seal rings. While these softer elastomers often have less extrusion resistance, they typically have greater temperature resistance. The features of the present invention are consistently labeled in all the figures described herein.

Figure 2:
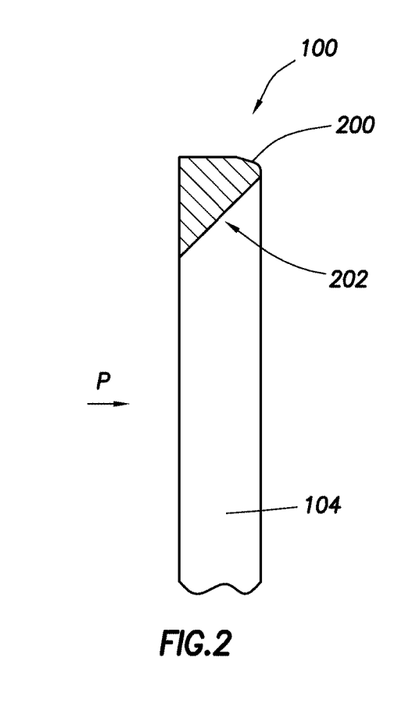
FIG. 2 shows a schematic drawing showing a cross-section of an embodiment of a seal ring backup device with a metallic wedge ring design.

The seal ring backup device 100 also features a scarf cut 102 and may be configured to form a wedge 202 (illustrated in FIG. 2). A scarf cut 102 is made by cutting the seal ring backup device 100 at an angle relative to both its horizontal and vertical planes (i.e., at a compound angle). This wedge 202 in turn may form a wedge type seal (FIGS. 5A and 5B) within a sealing system, thereby eliminating any extrusion gap. In the seal ring backup device 100, the geometrical configuration (e.g., angle) of the wedge 202 ensures that the seal ring backup device 100 will contact and close the clearance gap immediately and before the seal ring 300 (FIGS. 4A, 4B, 5A, and 5B) can extrude. The scarf cut 102 also allows the seal ring backup device 100 to expand rapidly without excessive energy thus making it useful for a variety of glands including blind glands. The seal ring backup device 100 may feature any of a variety of surface geometries (FIGS. 3A-3H) which can accommodate a broad range of seal ring sizes, shapes, and diameters.

Figure 1A:
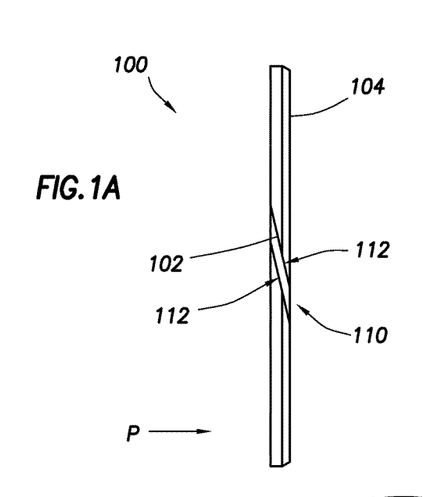
FIGS. 1A-1C show different schematic views of a seal ring backup device.
Figure 1B:
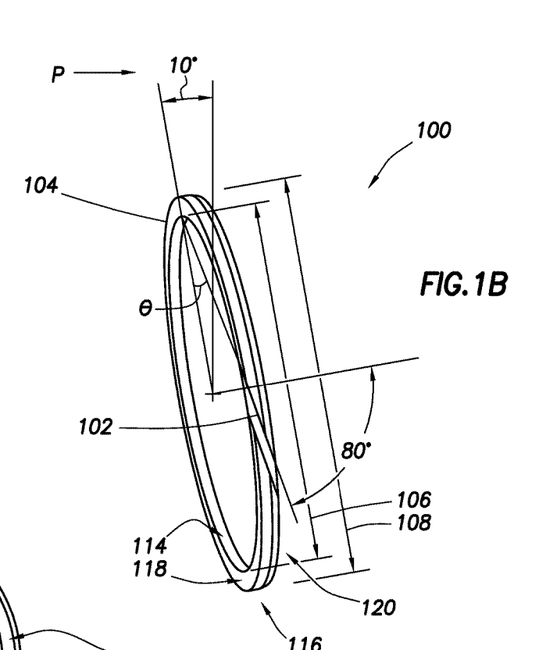
Figure 1C:
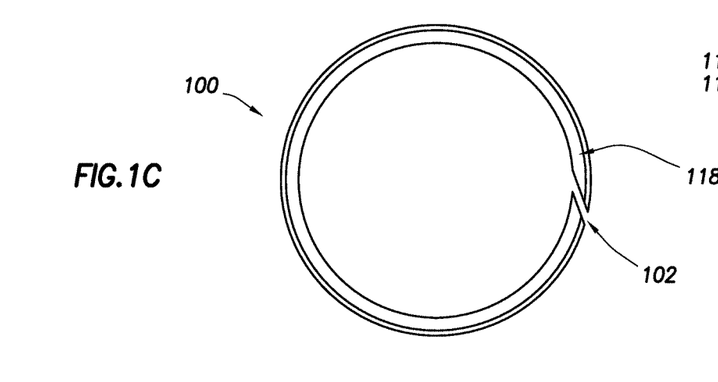

FIGS. 1A-1C show the seal ring backup device 100 in three related views. FIG. 1A is a reference view in which the vertical plane is perpendicular to the direction of fluid pressure. Pressure is labeled as P with an arrow indicating the direction of higher to lower pressure. In other words, the arrow points towards the region of lower pressure. In the embodiments shown in FIGS. 1A, 1B and 2, the seal ring backup device 100 is oriented so that the high pressure side is the left side of the seal ring backup device 100 while the low pressure side is the right side.

FIG. 1B shows the seal ring backup device 100 after rotation about a compound angle relative to the orientation shown in FIG. 1A. This view shows certain features of the seal ring backup device 100 that may be difficult to illustrate in the reference view shown in FIG. 1A.

Referring to FIG. 1B, the seal ring backup device 100 comprises an annular body 104 featuring a scarf cut 102. The annular body 104 has an inner diameter 106 and an outer diameter 108. The surface of the seal ring backup device 100 facing the center of the annular body 104 is referred to as the inner surface 114. The surface of the seal ring backup device 100 facing outward away from the center is referred to as the outer surface 116. The surface of the seal ring backup device 100 facing the high pressure side is referred to as the top surface 118 and may be flat or contoured. The surface of the seal ring backup device 100 facing the low pressure side is referred to as the bottom surface 120 and may be flat or contoured. While the descriptors of surfaces indicate directional orientation, they are not intended to be limiting, but are rather used for simplicity of description. FIG. 1C shows a top view of the seal ring backup device 100.

The scarf cut 102 can be created by a variety of methods, including wire Electrical Discharge Machining (EDM) cutting, sawing, milling, turning, or by any of a number of other methods for creating a slit in the annular body 104. The scarf cut 102 is generally made on the annular body 104, extending from the outer diameter 108 to the inner diameter 106. The scarf cut 102 may be made at some angle θ (FIG. 1B) relative to the top surface of the seal ring backup device 100. In some embodiments, this angle θ may be from about 5 to about 45 degrees. The scarf cut 102 results in a small gap 110 and two sloped faces 112 that may interlock or slide against each other. This gap 110 provides the seal ring backup device 100 with an inner diameter 106 that is slightly larger than the diameter of the receiving gland, thus allowing the user to easily install the seal ring backup device 100. The gap may be on the order of about 0.001 inches to about 0.01 inches. Once the seal ring backup device 100 is installed, the gap between the scarf cut 102 may close to conceal the scarf cut 102.

In general, the seal ring backup device 100 is constructed from a relatively rigid material compared to the seal ring 300. Suitable examples of materials include, but are not limited to, metals, alloys, ceramics, plastics, and thermoplastics. Suitable examples of alloys include, but are not limited to, beryllium copper, bronze, brass, steel, etc. Suitable examples of plastics and thermoplastics include, but are not limited to, polyphenylene sulfide (PPS), polyaryletherketone (PAEK), amorphous polymers, polyimides (PI), polyamides (PA), and sulfones. In some embodiments, the plastic material may be cross-linked such as thermosets, true epoxies, phenolics, and cross-linked PAEK. Other suitable materials for the seal ring backup device 100 include silica, carbon black, fibers of carbon, glass, clay, polymers, nanoclay, nanotubes, and boron.

Optionally, the annular body 104 of the seal ring backup device 100 may further comprise a surface coating. Suitable coating materials include a corrosion inhibitor, a corrosion resistant material, a friction reducer, a wear reducer, and any combinations of these. Suitable examples of corrosion inhibitors include, but are not limited to, hexamine, benzotriazole, phenylenediamine, dimethylethanolamine, polyaniline, nitrites, nitrates, and cinnamaldehyde. Suitable examples of corrosion resistant material include, but are not limited to, steel, inconel, nickel-based alloys, and titanium alloys. Friction reducers suitable for use in the present invention may be polymers and/or copolymers. The term "copolymer," as used herein, is not limited to polymers comprising two types of monomeric units, but includes any combination of monomeric units, e.g., terpolymers, tetrapolymers, and the like. An example of a suitable friction reducer comprises a quaternized aminoalkyl acrylate, such as a copolymer of acrylamide and dimethylaminoethyl acrylate quaternized with benzyl chloride. Another example of a suitable friction-reducing polymer comprises acrylamide. An example of a suitable friction reducer comprising acrylamide is a copolymer of acrylamide and acrylic acid. Such friction reducers may further comprise additional monomers, such as 2-acrylamido-2-methylpropanesulfonic acid, N,N-dimethyl acrylamide, vinylsulfonic acid, N-vinyl acetamide, N-vinyl formamide, and mixtures thereof.

FIG. 2 shows a cross-section view of the seal ring backup device 100 oriented similarly (i.e., pressure flows left to right) to the view shown in FIG. 1A. The hatched area represents the cross-sectioned portion of the seal ring backup device 100. In this embodiment, the top surface 118 (FIGS. 1B and 1C) of the seal ring backup device 100 is flat or nearly flat. Once installed, the top surface 118 should make contact with the seal ring 300.

Figure 3A:
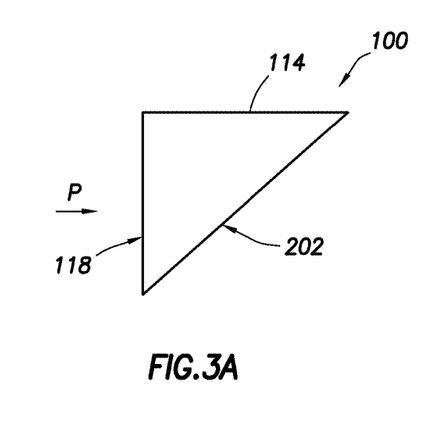
Figure 3B:
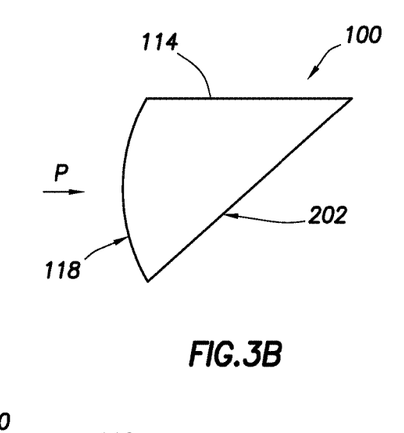
Figure 3C:
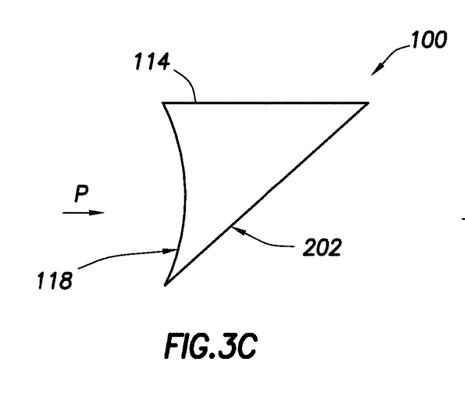
Figure 3D:
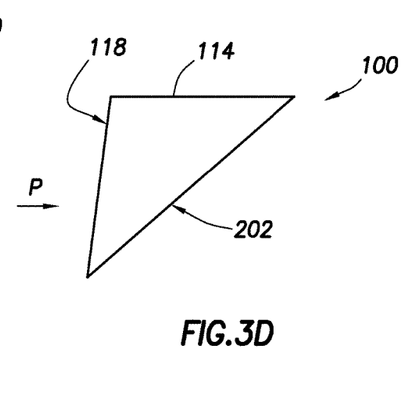
Figure 3E:
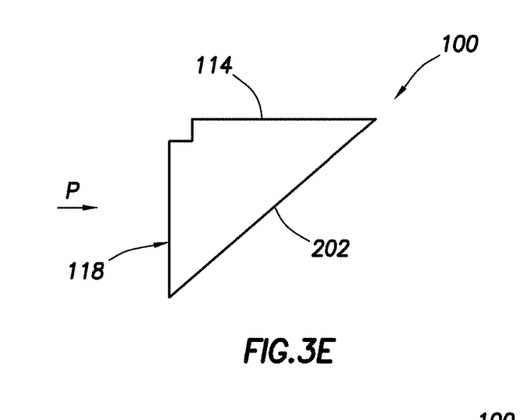
Figure 3F:
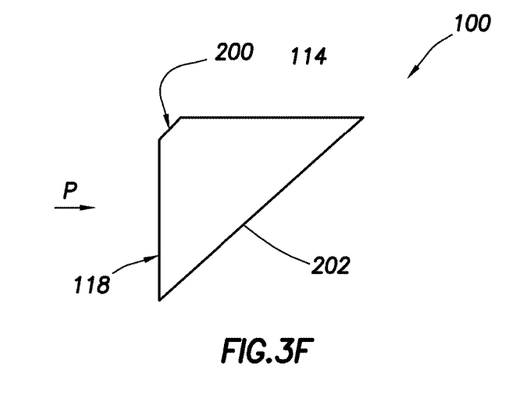
Figure 3G:
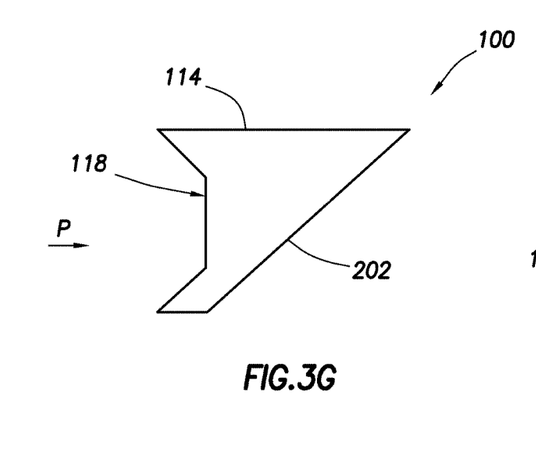
Figure 3H:
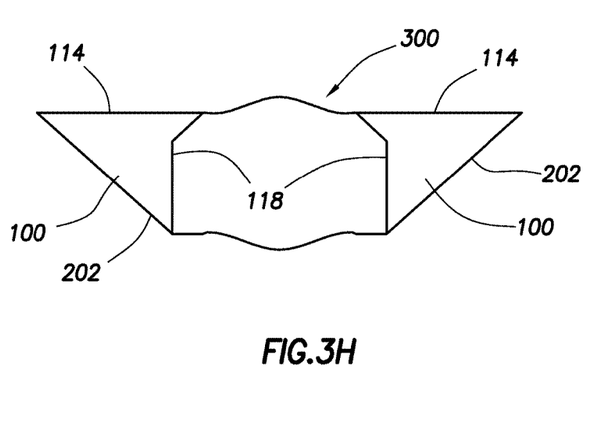
FIG. 3H shows the wedge shaped design used in a bonded seal.

In some embodiments, the top surface 118 may be angled, v-ringed or u-cupped, etc. to facilitate the contact between the top surface 118 and the seal ring 300 (FIG. 3H). In the embodiment shown in FIG. 3H, a seal ring backup device 100 has been installed on opposing sides of the seal ring 300. FIG. 3H also represents the bonding of the seal ring backup devices to the seal ring.

Referring again to the embodiment shown in FIG. 2, the inner surface 114 is contoured as a wedge 202. The bottom surface 120 also has a chamfered cut 200. In some embodiments, the top surface 118 may be flat (FIG. 3A), convex (FIG. 3B), concave (FIG. 3C), angled (FIG. 3D), stepped (FIG. 3E), V-ring or U-cupped (FIG. 3G), etc. These shapes allow the seal ring backup device 100 to conform to a variety of existing seal shapes.

Figure 4A:
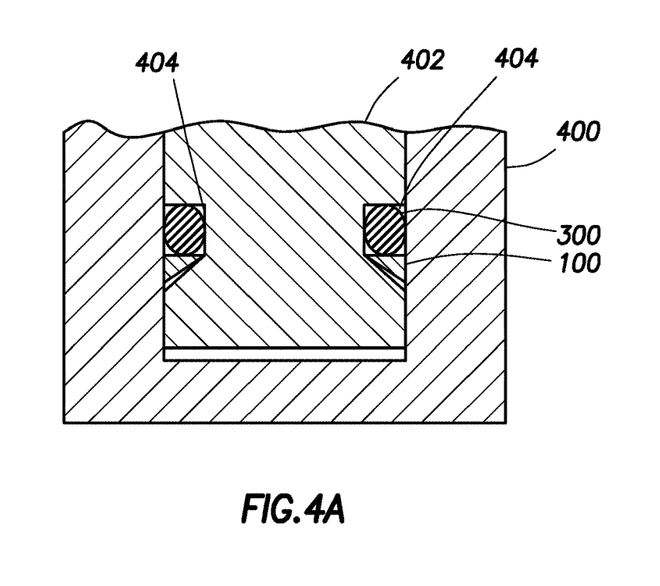
FIGS. 4A-4B show cross-sectional views of two separate embodiments of a seal ring backup devices, illustrated in place in engagement with an o-ring between a piston and a bore.
Figure 4B:
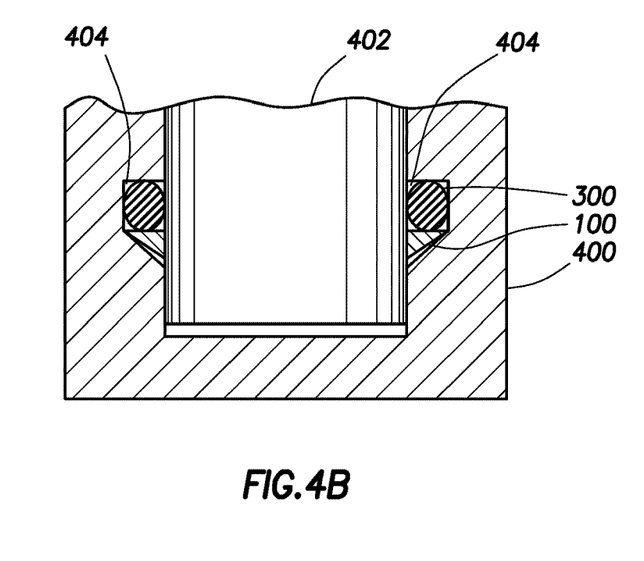

FIGS. 4A and 4B show at least two embodiments of a sealing system. Referring to FIGS. 4A and 4B, the seal ring backup device 100 is generally configured to fit into a gland 404 and engage a seal ring 300. FIG. 4A shows an embodiment in which the gland 404 has been machined directly onto a piston rod 402. Alternatively, FIG. 4B shows an embodiment in which the gland 404 has been machined onto the bore 400.

Figure 5A:
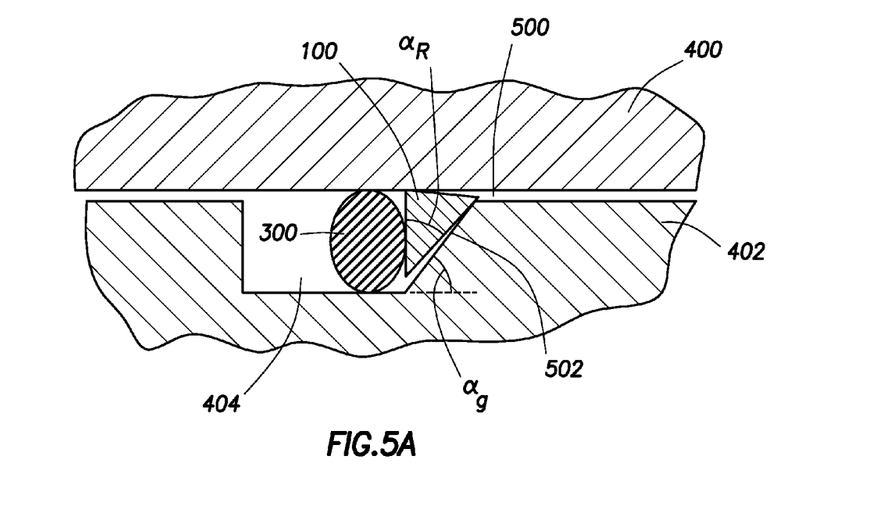
FIGS. 5A-5B show a cross-sectional close-up view of an embodiment of a seal ring backup device without (FIG. 5A) and with (FIG. 5B) external pressure.
Figure 5B:
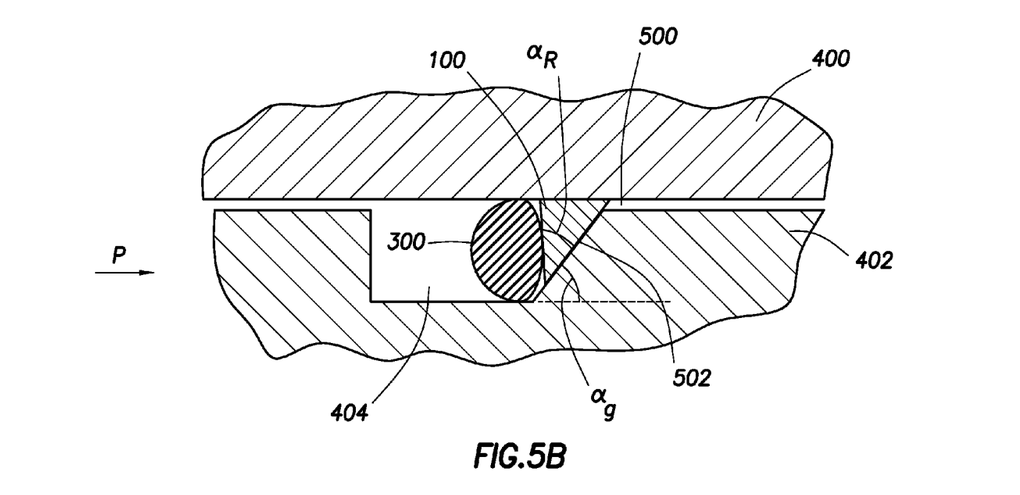

FIGS. 5A-5B show two separate cross-sectional views related to the embodiment shown in FIG. 4A. FIG. 5A shows the sealing system in a non-sealed state where there is no pressure difference inside the gland. FIG. 5B shows the sealing system in a sealed state in which the seal ring 300 and the seal ring backup device 100 are subject to a difference in pressure. Under external pressure, the seal ring 300 slides the seal ring backup device 100 up against the wall 502 of the gland cavity thereby closing the extrusion gap 500. It may also be desirable for the wall 502 of the gland 404 to be wedge shaped. The angle $\alpha_R$ of the seal ring backup device 100 and the angle $\alpha_g$ of the gland wall 502 may be configured so that the sum angle is about 90 degrees. The angle $\alpha_R$ refers to the angle relative to a plane passing perpendicular to a centerline of the piston and the seal ring backup device 100. The angle $\alpha_g$ refers to the angle relative to a plane passing horizontal to a centerline of the piston and the wall 502 of the gland 404. In some embodiments, it is desirable that both angles $\alpha_R$ and $\alpha_g$ are about 45 degrees. In some embodiments, it is desirable that angles $\alpha_R$ and $\alpha_g$ are slightly mismatched. In a non-limiting example, angle $\alpha_R$ may be designed to be about 44.5 degrees−0.5 degree+0 degrees and angle $\alpha_g$ may be designed to be about 45.0 degrees+0 degree and −0.5 degree.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A seal ring back-up device, comprising:
    an annular body having a top surface, a bottom surface opposite the top surface, an inner surface, and an outer surface opposite the inner surface, wherein the inner surface defines an inner diameter of the annular body and the outer surface defines an outer diameter of the annular body; and
    a scarf cut extending between the inner and outer surfaces of the annular body and defining a gap in the annular body that extends completely between the top surface and the bottom surface, the gap being defined at a compound angle relative to a horizontal plane and a vertical plane of the annular body,
    wherein the annular body is arrangeable within a gland.

2. The seal ring back-up device of claim 1, wherein the scarf cut provides opposing sloped faces each angled at the angle relative to the horizontal plane and the vertical plane.

3. The seal ring back-up device of claim 1, wherein the bottom surface is wedge shaped.

4. The seal ring back-up device of claim 1, wherein the annular body comprises a material selected from the group consisting of a metal, a metal alloy, a plastic, an amorphous polymer, glass, clay, ceramic, a thermoset, an epoxy, silica, carbon black, carbon fibers, nanoclay, nanotubes, boron, and any combination thereof.

5. The seal ring back-up device of claim 1, wherein the annular body comprises a material selected from the group consisting of polyphenylene sulfide, polyaryletherketone, an amorphous polymer, a polyimide, a polyamide, a sulfone, any derivative thereof, and any combination thereof.

6. The seal ring back-up device of claim 1, further comprising a surface coating disposed on the annular body, the surface coating being selected from the group consisting of a corrosion inhibitor, a corrosion resistant material, a friction reducer, a wear reducer, ceramic, and any combination thereof.

7. A sealing system, comprising:
a bore defining a bore wall;
a piston extendable within the bore and thereby defining an extrusion gap between the bore and the piston;
a gland defined in the piston and providing a gland wall;
a seal ring arranged within the gland; and
a seal ring back-up device extending about an axis and arranged within the gland and in direct contact with the seal ring, the seal ring back-up device comprising:
an annular body having a top surface, a bottom surface opposite the top surface and engageable with the gland wall, an inner surface, and an outer surface opposite the inner surface, wherein the outer surface and the bottom surface form, in a cross-section of the annular body, an acute angle;
a scarf cut extending between the inner and outer surfaces of the annular body and defining a gap in the annular body that extends completely between the top surface and the bottom surface, the gap being defined at a compound angle relative to a horizontal plane and a vertical plane of the annular body.

8. The sealing system of claim 7, wherein the scarf cut provides opposing sloped faces each angled at the angle relative to the horizontal plane and a vertical plane, the opposing sloped faces being slidingly engageable with one another during operation.

9. The sealing system of claim 7, wherein the bottom surface and the gland wall are each wedge shaped.

10. The sealing system of claim 7, wherein the annular body comprises a material selected from the group consisting of a metal, a metal alloy, a plastic, an amorphous polymer, glass, clay, ceramic, a thermoset, an epoxy, silica, carbon black, carbon fibers, nanoclay, nanotubes, boron, polyphenylene sulfide, polyaryletherketone, an amorphous polymer, a polyimide, a polyamide, a sulfone, any derivative thereof, and any combination thereof.

11. The sealing system of claim 7, further comprising a surface coating disposed on the annular body, the surface coating being selected from the group consisting of a corrosion inhibitor, a corrosion resistant material, a friction reducer, a wear reducer, ceramic, and any combination thereof.

12. The sealing system of claim 7, wherein the seal ring is bonded to the seal ring back-up device.

13. A method, comprising:
arranging a seal ring within a gland defined within a piston, the piston being extendable within a bore having a bore wall, and thereby defining an extrusion gap between the bore wall and the piston;
arranging a seal ring back-up device within the gland and in direct contact with the seal ring, the seal ring back-up device comprising:
an annular body having a top surface, a bottom surface opposite the top surface, an inner surface, and an outer surface opposite the inner surface, wherein the outer surface extends axially farther from the seal ring than does the inner surface; and
a scarf cut extending between the inner and outer surfaces of the annular body and defining a gap in the annular body that extends completely between the top surface and the bottom surface, the gap being defined at a compound angle relative to a horizontal plane and a vertical plane of the annular body;
forcing the seal ring against the top surface as an external pressure increases and thereby forcing the bottom surface against a gland wall defined in the gland; and
closing the extrusion gap with the seal ring back-up device as the bottom surface is forced against the gland wall and the outer surface is forced against the bore wall, thereby preventing the seal ring from deforming into the extrusion gap.

14. The method of claim 13, wherein the scarf cut provides opposing sloped faces each angled at the angle relative to the horizontal plane and the vertical plane.

15. The method of claim 13, wherein the scarf cut provides opposing sloped faces each angled at the angle relative to the horizontal plane and the vertical plane, and wherein closing the extrusion gap with the seal ring back-up device comprises slidingly engaging the opposing sloped faces on one another.

16. The method of claim 13, wherein the bottom surface and the gland wall are each wedge shaped, and forcing the bottom surface against the gland wall comprises slidingly engaging the bottom surface against the gland wall.

17. The method of claim 13, wherein forcing the seal ring against the top surface comprises forcing the seal ring against a surface contour shape provided on the top surface, the surface contour shape being selected from the group consisting of flat, convex, concave, angled, stepped at the outer surface, chamfered at the outer surface, and any combination thereof.

18. The method of claim 13, wherein arranging the seal ring back-up device within the gland is preceded by coating the annular body with a surface coating selected from the group consisting of a corrosion inhibitor, a corrosion resistant material, a friction reducer, a wear reducer, ceramic, and any combination thereof.

19. The sealing system of claim 7, wherein the outer surface has an axial length that is greater than an axial length of the inner surface.

* * * * *